United States Patent
Knaggs et al.

(10) Patent No.: US 7,059,305 B2
(45) Date of Patent: Jun. 13, 2006

(54) INTERNALIZED COMPONENT FOR FUEL TANKS

(75) Inventors: Richard Allen Knaggs, Ottawa Lake, MI (US); Vern Osenbaugh, Brooklyn, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 492 days.

(21) Appl. No.: 10/623,962

(22) Filed: Jul. 21, 2003

(65) Prior Publication Data

US 2005/0016600 A1    Jan. 27, 2005

(51) Int. Cl.
*F02M 37/04*    (2006.01)
(52) U.S. Cl. ........................ 123/509; 137/587
(58) Field of Classification Search ............... 123/509, 123/516, 520, 518; 137/202, 43, 587, 590, 137/15.17
See application file for complete search history.

(56) References Cited

U.S. PATENT DOCUMENTS

| | | | |
|---|---|---|---|
| 1,072,371 A * | 9/1913 | Stone | 137/590 |
| 1,448,580 A | 3/1923 | Tresemer et al. | |
| 1,469,937 A | 10/1923 | Hutchinson | |
| 3,186,399 A * | 6/1965 | Peters | 126/94 |
| 4,114,783 A | 9/1978 | Wempe et al. | 222/398 |
| 4,219,047 A | 8/1980 | Polley | 137/590 |
| 4,618,422 A | 10/1986 | Sasaki et al. | 210/172 |
| 4,716,931 A | 1/1988 | Shibamoto | 137/558 |
| 4,747,388 A | 5/1988 | Tuckey | |
| 5,052,437 A | 10/1991 | Danna | 137/587 |
| 5,236,000 A | 8/1993 | Kizer | 137/38 |
| 5,249,594 A | 10/1993 | Kizer | 137/15 |
| 5,954,082 A * | 9/1999 | Waldorf et al. | 137/202 |
| 5,960,816 A | 10/1999 | Mills et al. | 137/202 |
| 5,996,607 A | 12/1999 | Bergsma et al. | 137/202 |
| 6,035,883 A | 3/2000 | Benjey | 137/202 |
| 6,176,260 B1 | 1/2001 | Hahner et al. | 137/590 |
| 6,382,231 B1 | 5/2002 | Sugizaki et al. | 137/15.26 |
| 6,408,867 B1 | 6/2002 | Aoki et al. | 137/202 |
| 6,499,500 B1 * | 12/2002 | Rosseel | 137/15.17 |
| 2002/0157714 A1 * | 10/2002 | Wong et al. | 137/587 |

FOREIGN PATENT DOCUMENTS

FR    2 583 684 A2    12/1986
GB    2 172 864 A     10/1986

* cited by examiner

*Primary Examiner*—Mahmoud Gimie
(74) *Attorney, Agent, or Firm*—MacMillan, Sobanski, Todd, LLC

(57) ABSTRACT

An assembly is provided for internal placement of a component within a vehicle fuel tank. The assembly generally includes a two housing elements biased apart to retain the component within the fuel tank. The component may be non-destructively and selectively attached to the tank. Additional features prevent unwanted movement of the component relative to the fuel tank.

20 Claims, 3 Drawing Sheets

INTERNALIZED COMPONENT FOR FUEL TANKS

FIELD OF THE INVENTION

The present invention relates generally to internalizing components in automobile fuel tanks, and more particularly relates to attaching components to the inner wall of blow-molded fuel tanks.

BACKGROUND OF THE INVENTION

Attaching a component internally within a blow-molded fuel tank is a complicated process. Generally, these internal components have been designed with weld feet on the appropriate portions for attachment to the inner wall of the tank. The component is placed on a blow pin and is inserted inside a molten plastic parison. The weld feet are then melted into the molten parison as the fuel tank mold is closed.

Unfortunately, this method results in several drawbacks. For example, this process increases the manufacturing cycle time and destructive testing must be done to assure that the welding of the weld feet is secure to the tank shell. Finally, these internalized components are difficult to service. Accordingly, there exists a need to provide an improved method or structure for attaching a component internally within a blow-molded fuel tank.

BRIEF SUMMARY OF THE INVENTION

The present invention provides an assembly for internal placement of a component within a vehicle fuel tank. The assembly generally includes a first housing having a first projection form thereon and a second housing having a second projection form thereon. The second housing is adjustable relative to the first housing, and a spring biases the first and second housings apart. The fuel tank is defined in part by a first wall and a second wall. The first wall includes a first depression sized to receive the first projection and the second wall includes a second depression sized to receive the second projection. In this way, the first and second projections are biased into the first and second depressions to securely hold the component within the vehicle fuel tank.

According to more detailed aspects, the component and the first and second housings are located entirely within the fuel tank. That is, the component does not utilize an access opening extending through the fuel tank wall to provide secure attachment. A pin may be attached to the first housing to limit the movement of the second housing relative to the first housing. Preferably, the first housing telescopically receives the second housing. The first housing may contain a grade vent valve, and a third housing may be positioned between the first and second housings. Here, the spring engages the second and third housings to bias the second housing away from the first and third housings. The third housing telescopically engages the second housing.

The first and second projections are preferably tapered to promote seating of the projections within the depressions. The first and second projections may include a key member which corresponds to key holes defined by the first and second depressions. In order to prevent rotation of the housings and the component, the projections may have a non-circular cross-sectional shape. Preferably, the first and second projections have an oblong cross-sectional shape. The first and second depressions are preferably formed on first and second plateaus raised from the surface of the first and second walls. This helps the manufacturer to identify the location of attachment. Further, the first and second housings can define a rim from which the projection extends to promote seating on the plateau.

In another embodiment of the present invention, a component is provided for internal placement within a vehicle fuel tank. The component generally includes a first housing and a second housing. A spring biases the first and second housings apart. A first connection member is attached to the first housing and a second connection member is attached to the second housing. The second housing is adjustable relative to the first housing to position the first and second connection members for selective engagement of the fuel tank.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
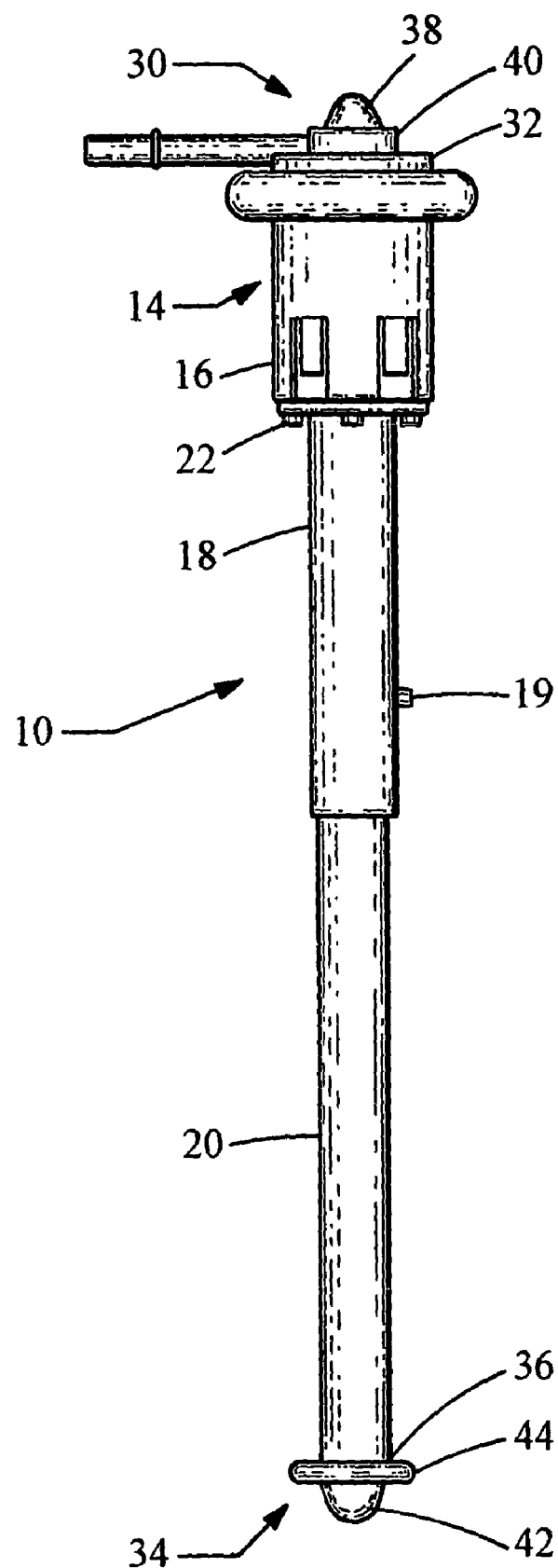
FIG. 1 is a front view of a component for internal placement within a vehicle fuel tank.
Figure 2:
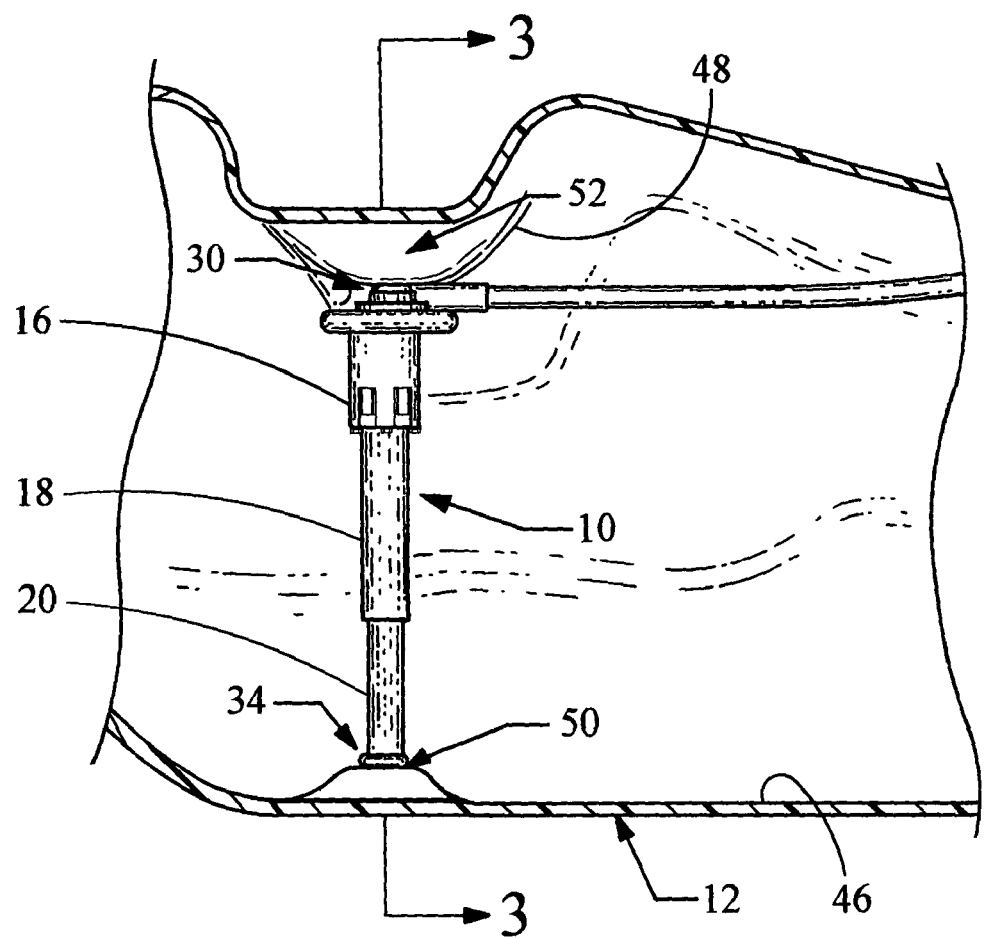
FIG. 2 is a front view of an assembly having the component shown in FIG. 1 internally attached-to a vehicle fuel tank.

Turning now to the figures, FIG. 1 depicts a front view of a component 10 for internal placement within a vehicle fuel tank 12 (FIG. 2). For purposes of illustrating the present invention, the component 10 has been shown as including a grade vent valve 14 which includes a first housing 16. The details of the valve 14 will not be described here, but suffice it to say that a grade vent valve is a typical fuel tank component which closes off the flow of fuel from the tank based on the grade or angular position of the valve 14 and vehicle relative to the ground. Nonetheless, it will be recognized by those skilled in the art that numerous other components that are desired to be located within the fuel tank 12 may be employed in accordance with the teachings of the present invention.

The component 10 further includes a second housing 18 and a third housing 20. While the first and second housings 16, 18 have been shown as separate elements connected by screws 22, it will be recognized that the first and second housings 16, 18 may be integrally formed as a single housing member. The second and third housings 18, 20 are tubular in shape, and the second housing 18 telescopically receives the third housing 20. It will be recognized that the third housing 20 could also telescopically receive the second housing 18. In either case, the inner housing member could comprise a solid member, although the housing preferably has a tubular shape. It can be seen in FIG. 2 that the first, second and third housings 16, 18, 20, and more specifically the entire component 10 is located entirely within the fuel tank 12. That is, the component 10 does not utilize an access opening into the tank 12 to secure the component 10 therein. Stated another way, the receiving members 50, 52 and their depressions 56, 60 are horizontally spaced from the access opening.

Figure 3:
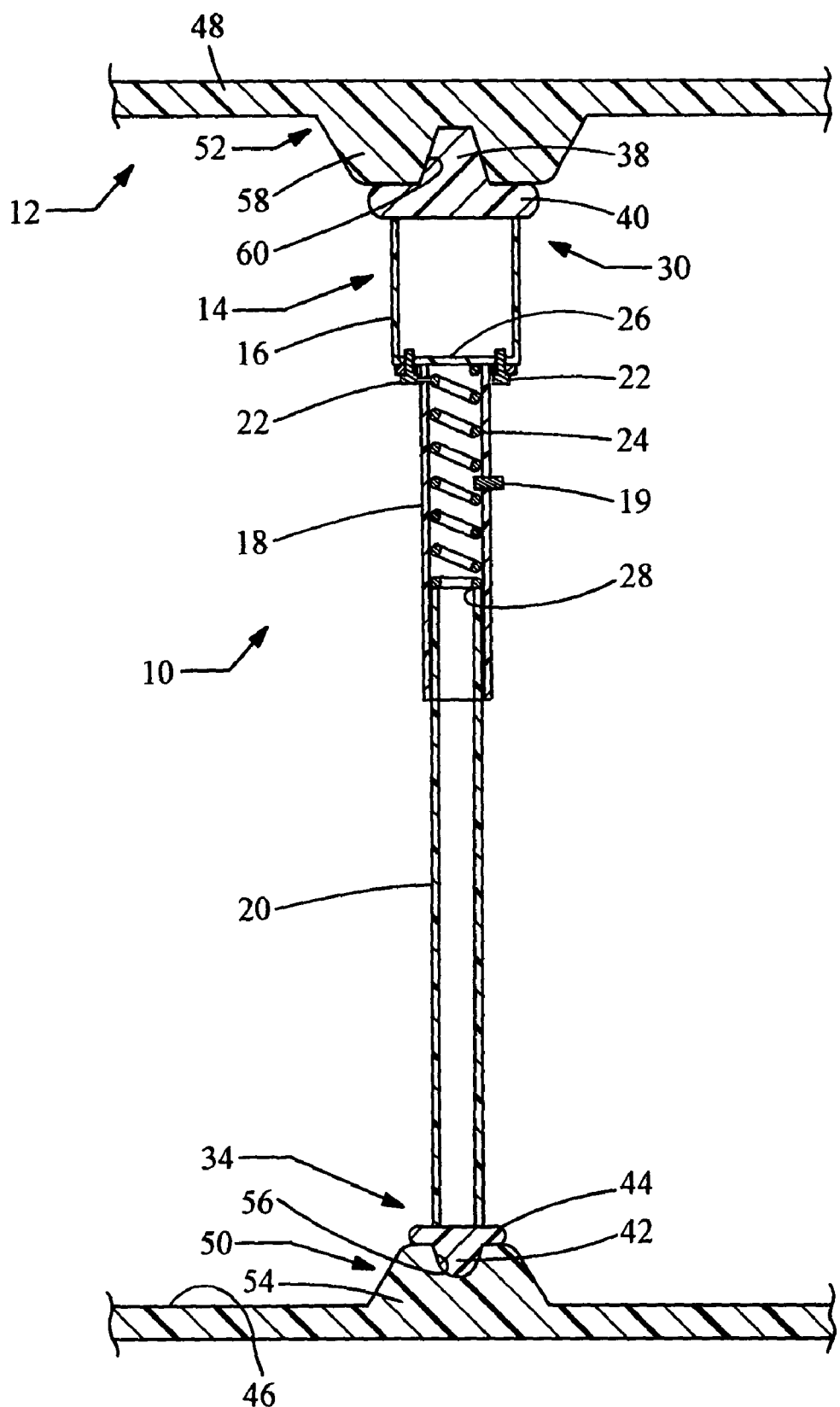
FIG. 3 is a cross-sectional view taken about the line 3—3 of FIG. 2.

As best seen in the cross-sectional view of FIG. 3, the second housing 18 telescopically receives the third housing 20, and a spring 24 is interposed between the housings 18, 20. More specifically, the spring 24 is positioned within the second housing 18 and engages a first end 26 of the first housing 16 and a first end 28 of the third housing 20. The spring 24 biases the second and third housings 18, 20 away from each other, i.e., in opposing directions. A pin 19 extends through the second housing 18 and limits the distance which the third housing 20 may extend into the second housing 18.

The first housing 14 includes a first connection member 30 at its free end 32, while the third housing 20 includes a second connection member 34 at its free end 36. The first connection member 30 generally includes a projection 38 extending away from a flange 40. Similarly, the second connection member 34 includes a projection 42 extending away from a flange 44.

As best seen in FIGS. 2 and 3, the connection members 30, 34 are structured to correspond with receiving members 50, 52 formed in the fuel tank 12. More specifically, the fuel tank 12 is defined in part by a lower wall 46 and an opposing upper wall 48. As best seen in FIG. 3, the receiving member 50 is integrally formed in the lower wall 46 and includes a raised portion or plateau 54 defining a depression 56. Similarly, the upper tank wall 48 includes the receiving member 52 integrally formed therein, defined by a raised plateau 58 having a depression 60 formed therein. The depressions 56, 60 are sized and structured to correspond to the projections 38, 42 defined by the first and third housings 16, 20. The flanges 40, 44 are structured to rest against the exposed surface of the plateaus 54, 58.

As shown in the figures, the projections 38, 42 are tapered, as are the corresponding depressions 56, 60. This aids in the proper seating of the component 10 within the fuel tank 12. As also shown, the projections 38, 42 have a circular cross-sectional shape. However, it will be recognized that the projections 38, 42 may have any desired shape. One preferred shape is a non-circular shape, such as a polygonal or oblong shape. Such non-circular cross-sectional shapes aid in restricting the motion of the component 10, and more specifically the first and second housings 16, 20. By virtue of the non-circular shape, the structural members (i.e., housings 16, 18, 20) will be prevented from rotating within the tank 12. To the same end, the first and second projections 38, 42 could also include a radially extending key member (not shown) which corresponds with a key hole or key slot formed into the depressions 56, 60.

In operation, the fuel tank 12 is molded with the receiving members 50, 52 integrally formed therein. The component 10 is then inserted through an access opening, and the third housing 20 is displaced relative to the second housing 18 to shorten the overall length of the component 10. The projections 38, 42 are then located within the depressions 56, 60, and the biasing force provided by spring 24 presses the first housing 16 and its projection 38 into engagement with the depression 60 formed in the upper wall 48 of the tank 12. Similarly, the third housing 20 is biased downwardly such that the projection 42 engages the depression 56 of the lower wall 46 of the fuel tank 12. In this way, the relative positioning of the first and second connection members 30, 34 (biased apart from each other via spring 24) allows for selective engagement of the fuel tank 12, and in turn such as the attachment of the component 10. This provides easy servicing of the component 10 while being nondestructive of the fuel tank 12.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An assembly for internal placement of a component within a vehicle fuel tank, the assembly comprising:
    a first housing having a first projection formed thereon;
    a second housing adjustable relative to the first housing, the second housing having a second projection formed thereon, the component being mounted to at least one of the first and second housings;
    a spring biasing the first and second housings apart; and
    a fuel tank defined in part by an first wall and a second wall, the first wall including a first depression sized to receive the first projection, the second wall including a second depression sized to receive the second projection wherein the depressions maintain integrity of the walls without penetration;
    wherein the first projection is seated within the first depression, and wherein the second projection is seated within the second depression.

2. The assembly of claim 1, wherein the first and second housings are located entirely within the fuel tank.

3. The assembly of claim 1, wherein both the first and second housing are adjustable relative to the first and second walls of the fuel tank.

4. The assembly of claim 1, further comprising a pin attached to the first housing, the first pin positioned to limit the movement of the second housing relative to the first housing.

5. The assembly of claim 1, wherein the first housing telescopically receives the second housing.

6. The assembly of claim 1, wherein the first housing contains a grade vent valve.

7. The assembly of claim 1, further comprising a third housing positioned between the first and second housings, the spring engaging the second and third housings to bias the second housing away from the first and third housings.

8. The assembly of claim 1, wherein the first and second projections are tapered to promote seating of the first and second projections in the first and second depressions.

9. The assembly of claim 1, wherein the first and second projections each include a key member and the first and second depressions each include a key hole size to receive the key member.

10. The assembly of claim 1, wherein the first and second projections have a non-circular cross-sectional shape.

11. The assembly of claim 10, wherein the first and second projections have an oblong cross-sectional shape.

12. The assembly of claim 1, wherein in the first and second depressions are formed on first and second plateaus raised from the surface of the first and second walls.

13. The assembly of claim 12, wherein the first housing defines a first rim from which the first projection extends.

14. The assembly of claim 1, wherein the first wall defines an access opening, the first and second depressions being horizontally spaced from the access opening.

15. A component for internal placement within a vehicle fuel tank, the component comprising:
- a first housing and a second housing;
- a spring biasing the first and second housings apart;
- a first connection member attached to the first housing;
- a second connection member attached to the second housing;
- the second housing being adjustable relative to the first housing to position the first and second connection members for selective engagement of the fuel tank.

16. The component of claim 15, wherein the first and second connection members each include a projection that seats within depressions formed in respective opposing wall sections within the vehicle fuel tank without penetrating the wall sections.

17. The component of claim 16, wherein the projections are tapered to promote seating of the projections.

18. The component of claim 16, wherein the projections have an oblong cross-sectional shape.

19. The component of claim 15, wherein the first and second connection members each include a rim and a projection extending therefrom.

20. The component of claim 15, wherein the component is located entirely within the fuel tank.

* * * * *